United States Patent
Nau

(10) Patent No.: US 7,414,704 B1
(45) Date of Patent: Aug. 19, 2008

(54) LASER LIGHT RECEIVER APPARATUS WITH AUTOMATICALLY ADJUSTABLE ZERO-REFERENCE POINT

(75) Inventor: Kevin R. Nau, New Carlisle, OH (US)

(73) Assignee: Apache Technologies, Inc., Dayton, OH (US)

( * ) Notice: Subject to any disclaimer, the term of this patent is extended or adjusted under 35 U.S.C. 154(b) by 0 days.

(21) Appl. No.: 11/880,972

(22) Filed: Jul. 25, 2007

Related U.S. Application Data

(60) Provisional application No. 60/848,471, filed on Sep. 29, 2006.

(51) Int. Cl.
 *G01C 3/08* (2006.01)
(52) U.S. Cl. .................................... 356/4.08
(58) Field of Classification Search ....... 356/3.01–3.15, 356/4.01–4.1, 5.01–5.15, 6–22
 See application file for complete search history.

(56) References Cited

U.S. PATENT DOCUMENTS

| | | | |
|---|---|---|---|
| 81,764 A | 9/1868 | Fisher | |
| 259,945 A | 6/1882 | Thomas | |
| 550,443 A | 11/1895 | Deal | |
| 1,604,100 A | 10/1926 | Kenerson | |
| 1,737,989 A | 12/1929 | Wollenschlager | |
| 2,174,947 A | 10/1939 | Ramsey | |
| 3,745,638 A | 7/1973 | Minera | |
| 3,861,664 A | 1/1975 | Durkee | |
| 4,404,873 A | 9/1983 | Radish | |
| 4,767,110 A | 8/1988 | Yang | |
| 5,401,354 A | 3/1995 | Colucci | |
| 5,486,690 A | 1/1996 | Ake | |
| 5,553,963 A | 9/1996 | Hoy et al. | |
| 5,625,555 A * | 4/1997 | Davis | 701/7 |
| 5,733,061 A | 3/1998 | Child | |
| 5,842,671 A | 12/1998 | Gibbs | |
| 6,133,991 A | 10/2000 | Ake | |
| 6,398,175 B1 * | 6/2002 | Conner et al. | 248/228.3 |
| 7,012,237 B1 | 3/2006 | Ake | |
| 7,110,092 B2 | 9/2006 | Kasper et al. | |

\* cited by examiner

*Primary Examiner*—Thomas H. Tarcza
*Assistant Examiner*—Luke D Ratcliffe
(74) *Attorney, Agent, or Firm*—Frederick H. Gribbell

(57) ABSTRACT

An improved laser light receiver is provided that senses a laser light beam and determines positional elevation of the laser receiver based on the position where the laser light beam impacts the light sensors of the laser receiver. The laser receiver automatically adjusts its zero-reference point when it senses a magnet that has been mounted on a clamping device that holds the housing of the laser light detector in at least two predetermined attitudes with respect to the clamping device. Thus the invention operates as a clamp-actuated "offset" on-grade mode for the laser receiver.

27 Claims, 7 Drawing Sheets

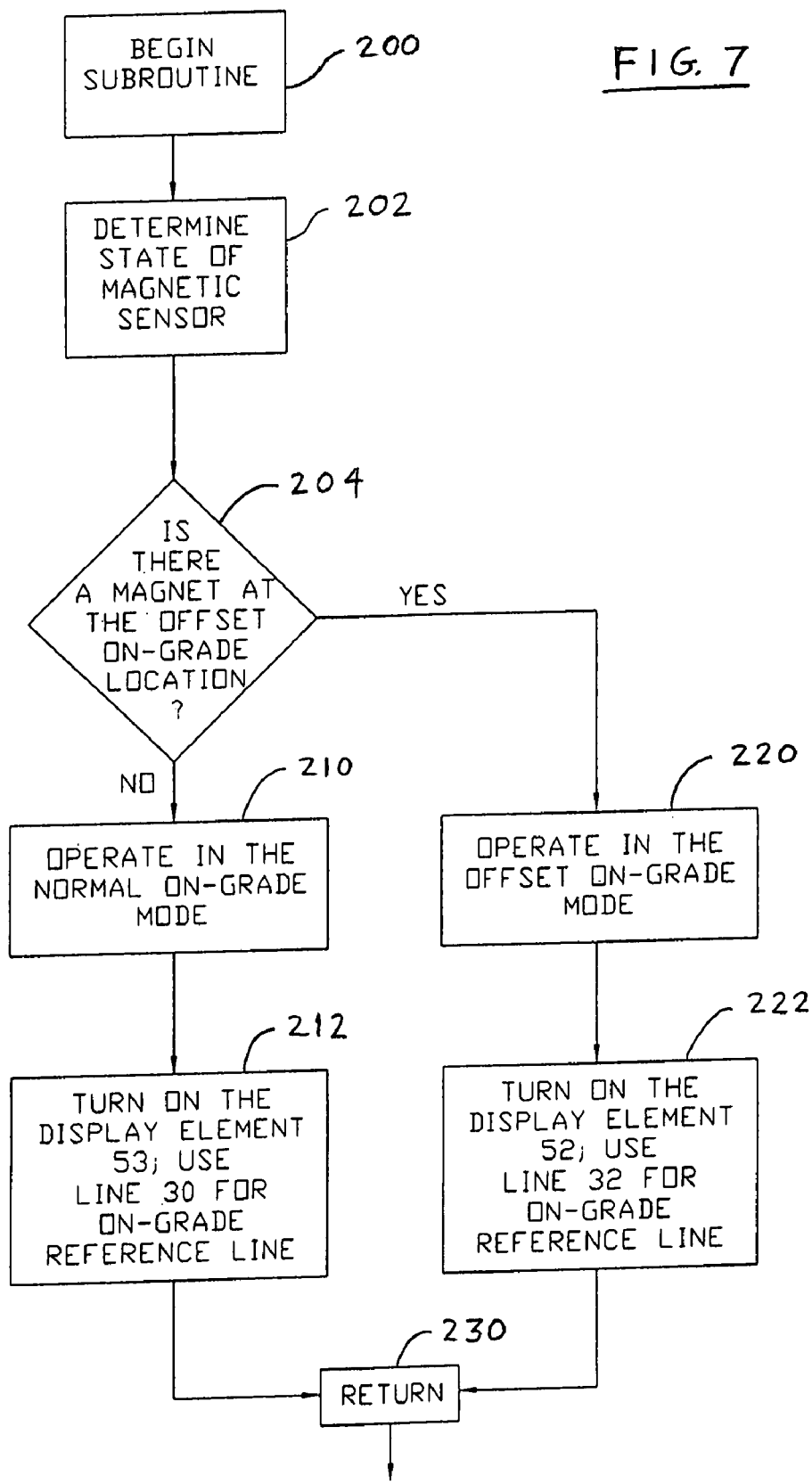

LASER LIGHT RECEIVER APPARATUS WITH AUTOMATICALLY ADJUSTABLE ZERO-REFERENCE POINT

CROSS-REFERENCE TO RELATED APPLICATIONS

The present application claims priority to provisional patent application Ser. No. 60/848,471, titled "LASER LIGHT RECEIVER APPARATUS WITH AUTOMATICALLY ADJUSTABLE ZERO-REFERENCE POINT," filed on Sep. 29, 2006.

TECHNICAL FIELD

The present invention relates generally to laser light receivers and is particularly directed to laser receivers of the type which sense a laser light beam and determine positional elevation of the laser receiver based on the position where the laser light beam impacts the light sensors of the laser receiver. The invention is specifically disclosed as a laser light receiver that automatically adjusts its zero-reference point (i.e., its "on-grade" reference elevation) when it senses a magnet that has been mounted on a clamping device, in which the clamping device holds the housing of the laser light detector, and holds this combination to a building structure, or to a grade rod. The clamping device is capable of holding the laser receiver at two or more predetermined positions or attitudes.

BACKGROUND OF THE INVENTION

Conventional laser receivers detect incoming laser light beams by use of one or more laser light sensors that are impacted by the laser light beam. The laser light sensor(s) typically output one or more electrical signals that are directed to a control circuit that determines the position where the laser light beam has impacted on the sensor(s). If the laser light beam strikes the sensor(s) at a specific predetermined location (or within a small range of such locations), then the laser receiver is then said to be "on-grade," which often is the desired location at that moment. If the laser light beam strikes the sensors(s) at a different location, then the laser receiver is then said to be either "above-grade" or "below-grade." These grade indications are typically displayed on some type of easily viewed LCD or LED display built into the laser receiver, and the user will then know which way to move the laser receiver to ultimately position it in the ON-grade position. Once properly located, the laser receiver in essence "tells" the user that he or she can begin work on that portion of the construction site.

Other ways of using a laser receiver also can be useful. For example, an "offset" on-grade mode of a laser receiver typically provides more sensing height when the user is working above the "on-grade" position of the sensor than below "on-grade." In other words, the laser light sensors extend for a greater distance below the on-grade position (on the laser receiver's sensors) than above the on-grade position. This is useful in situations where a worker is removing material from a jobsite (when using a bulldozer, for example), thereby allowing gradual removal of material until an on-grade condition is achieved, thus reducing the chances of overshooting the target elevation, where material would then have to be added to correct for this. It is also useful in gradually driving reference stakes to the correct elevation on a jobsite, again reducing the chances of overshooting the target elevation where a stake would then have to be adjusted by pulling it up out of the ground.

The use of an "offset" on-grade mode could also provide more sensing height below grade than above grade, and if this adjustment is desired by a user/customer, it could be made available as an option. This is not commonly desired by most users/customers, but it could be useful in a situation where material is being added to a jobsite.

SUMMARY OF THE INVENTION

Accordingly, it is an advantage of the present invention to provide a laser receiver that detects a beam of laser light energy to determine the positional elevation of the laser receiver based on the position where the laser light beam impacts the light sensors of the laser receiver, and which automatically adjusts its zero-reference point when it detects a predetermined external condition.

It is another advantage of the present invention to provide a laser receiver that determines the positional elevation of the laser receiver when a beam of laser light energy impacts the light sensors of the laser receiver, in which the laser receiver has a housing that attaches to a mounting clamp, such that the laser receiver automatically adjusts its zero-reference point when it detects a predetermined external condition that is built into the mounting clamp.

It is yet another advantage of the present invention to provide a laser receiver that determines the positional elevation of the laser receiver when a beam of laser light energy impacts the light sensors of the laser receiver, and which automatically adjusts its zero-reference point when it detects a presence or absence of a magnet at a predetermined location that is proximal to the laser receiver.

It is still another advantage of the present invention to provide a laser receiver that determines the positional elevation of the laser receiver when a beam of laser light energy impacts the light sensors of the laser receiver, in which the laser receiver has a housing that attaches to a mounting clamp, such that the laser receiver automatically adjusts its zero-reference point when it detects a presence or absence of a magnet that is built into the mounting clamp.

It is a further advantage of the present invention to provide a laser receiver that determines the positional elevation of the laser receiver when a beam of laser light energy impacts the light sensors of the laser receiver, and which automatically adjusts its zero-reference point when it detects a predetermined external condition that comprises one of a permanent magnet that is detected by a magnetic sensor, or a mechanical member that is detected by an electromechanical limit switch, or a mechanical member that is detected by an optical position sensor, or an optical target pattern that is detected by an optical vision sensor.

Advantages and novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a laser receiver apparatus is provided, along with a mounting clamp. The clamp includes a permanent magnet that can be detected by a magnetic sensor in the laser receiver, depending on the mounting position of the clamp with respect to the housing of the laser receiver. When in a predetermined orientation, the laser receiver will automatically operate in an "offset" on-grade mode, and when not in that predetermined orientation, the laser receiver will automatically operate in a "normal" on-grade mode; this functions to automatically adjust the laser receiver's zero-reference point.

In accordance with another aspect of the present invention, a laser light receiver system is provided, which comprises: (a) a laser light receiver, having: (i) a housing that has at least two predetermined mounting locations; (ii) a first laser light photosensor, which generates a first signal if receiving a beam of laser light energy from an external laser light source; (iii) a visible readout to indicate if the laser light receiver is substantially on-grade with respect to the received beam of laser light energy; (b) a mounting apparatus having: (i) at least one mating area to receive the housing at one of the at least two predetermined mounting locations of the housing; and (ii) a physical feature that is positioned at a predetermined location with respect to the at least one mating area; and (c) the laser light receiver further comprising: (iv) a sensor that detects the physical feature of the mounting apparatus, and produces a second signal having a first logic state if the laser light receiver detects a first state of the physical feature of the mounting apparatus, and produces the second signal having a second logic state if the laser light receiver detects a second state of the physical feature of the mounting apparatus; and (v) a processing circuit that receives the first signal and the second signal, wherein the processing circuit is configured: (A) to automatically select a zero-reference point from at least two possible states; (B) to enable a first state for the zero-reference point if the processing circuit receives the first logic state of the second signal; (C) to enable a second state for the zero-reference point that is different than the first state of the zero-reference point if the processing circuit receives the second logic state of the second signal; and (D) to determine whether the received beam of laser light energy has impacted the first laser light photosensor at an on-grade position, with respect to the enabled zero-reference point.

In accordance with yet another aspect of the present invention, a laser light receiver system is provided, which comprises: (a) a laser light receiver, having: (i) a housing that has at least two predetermined mounting locations; (ii) a first laser light photosensor, which generates a first signal if receiving a beam of laser light energy from an external laser light source; (iii) a visible readout to indicate if the laser light receiver is substantially on-grade with respect to the received beam of laser light energy; and (b) a mounting apparatus having: (i) a mating area to receive the housing at one of the at least two predetermined mounting locations of the housing; and (ii) a permanent magnet positioned at a predetermined location that is proximal to the mating area; (c) the laser light receiver further comprising: (iv) a magnetically-actuated sensor that produces a second signal having a first logic state if the magnetically-actuated sensor is substantially within a predetermined proximity of the permanent magnet that is located on the mounting apparatus, and produces the second signal having a second logic state if the magnetically-actuated sensor is not substantially within the predetermined proximity of the permanent magnet; and (v) a processing circuit that receives the first signal and the second signal, wherein the processing circuit is configured: (A) to automatically select a zero-reference point from at least two possible states; (B) to enable a first state of the zero-reference point if the processing circuit receives the first logic state of the second signal; (C) to enable a second state of the zero-reference point that is different than the first state of the zero-reference point if the processing circuit receives the second logic state of the second signal; and (D) to determine whether the received beam of laser light energy has impacted the first laser light photosensor at an on-grade position, with respect to the enabled zero-reference point.

In accordance with still another aspect of the present invention, a laser light receiver is provided, which comprises: (a) a housing that has at least two predetermined mounting locations; (b) a laser light photosensor, which generates a signal if receiving a beam of laser light energy from an external laser light source; (c) a visible readout to indicate if the laser light receiver is substantially on-grade with respect to the received beam of laser light energy; (d) a sensor that detects a predetermined external physical parameter proximal to one of the at least two predetermined mounting locations, wherein: (i) the sensor exhibits a first output state if it detects the predetermined external physical parameter proximal to a first one of the at least two predetermined mounting locations; (ii) the sensor exhibits a second output state if it does not detect the predetermined external physical parameter proximal to the first one of the at least two predetermined mounting locations; and (e) a processing circuit that receives the signal and determines a present output state of the sensor, wherein the processing circuit is configured: (i) to automatically select a zero-reference point from at least two possible states; (ii) to enable a first state of the zero-reference point if the processing circuit determines the first output state of the sensor; (iii) to enable a second state of the zero-reference point that is different than the first state of the zero-reference point if the processing circuit determines the second output state of the sensor; and (iv) to determine whether the received beam of laser light energy has impacted the laser light photosensor at an on-grade position, with respect to the enabled zero-reference point, and if so to indicate that on-grade status on the visible readout.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 7 is a flow chart of the steps performed by a processing circuit of the laser receiver of FIG. 1.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

As noted above, an "offset" on-grade mode of a laser receiver typically provides more sensing height when the user is working above the "on-grade" position of the photosensor than below "on-grade." The opposite sense of an "offset" on-grade mode could also provide more sensing height below grade than above grade, if this adjustment is desired by a user/customer. The present invention helps to more easily accomplish these alternative laser receiver operating modes.

During normal operation in many instances, the photosensor of the laser receiver provides approximately an equal length of elevation information above the on-grade position as below the on-grade position—in other words, the on-grade position of the photosensor is at or nearly at the middle of the total sensing height capability of the one or more laser light sensors built into the laser receiver. It should be noted that a single laser receiver unit may have many individual photocells, for example, that make up the laser light sensors. Examples of such multiple photocell laser receivers are disclosed in certain U.S. patents, including U.S. Pat. No. 7,012,237, titled "MODULATED LASER LIGHT DETECTOR," which issued on Mar. 14, 2006; U.S. Pat. No. 6,133,991, titled "MULTI-SEGMENT COMPOSITE PHOTOCELL DEVICE," which issued on Oct. 17, 2000; and U.S. Pat. No. 5,486,690, titled "METHOD AND APPARATUS FOR DETECTING LASER LIGHT," which issued on Jan. 23, 1996. However, some newer laser receiver units will include only a single laser light sensor, such as a "rod" sensor, that is capable of outputting a variable signal when impacted by a laser light beam at multiple different positions along the length of the rod sensor. Such a rod sensor is disclosed in U.S. Pat. No. 7,110,092, titled "MEASURING DEVICE AND MEASURING METHOD FOR DETERMINING DISTANCE AND/OR POSITION," which issued on Sep. 19, 2006. The above patents are incorporated by reference herein.

Figure 1:
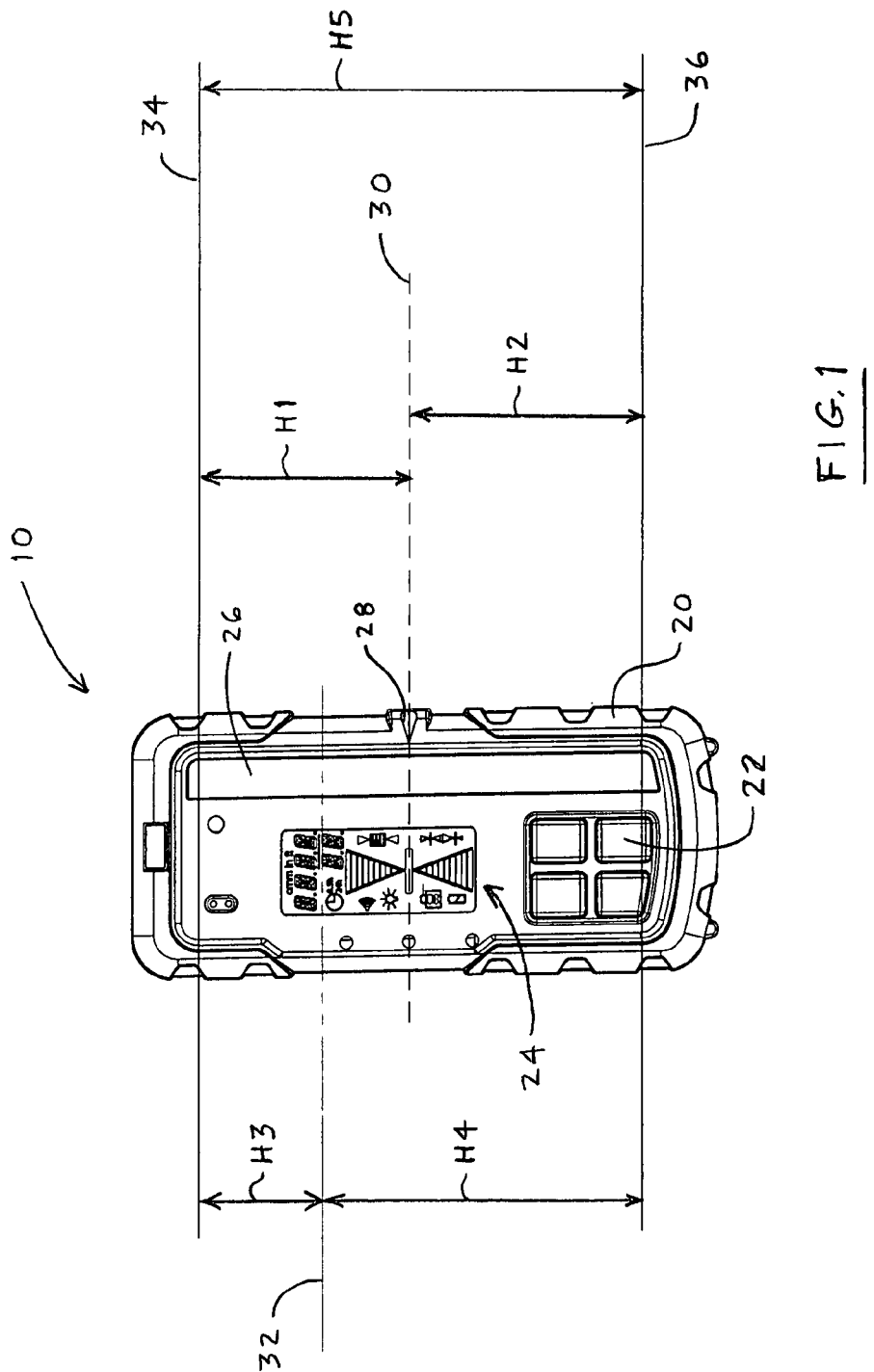
FIG. 1 is a front view of a laser receiver unit, as constructed according to the principles of the present invention.

In FIG. 1, a laser receiver unit is illustrated, generally designated by the reference numeral 10. Laser receiver 10 includes an external housing 20, a set of user controls 22 (typically pushbutton switches or membrane switches), a display 24 that indicates on-grade, above-grade, or below-grade (plus other important status information), and a laser light receiving sensor 26. There is an "on-grade notch" 28 along the right-hand side of the receiver housing (as viewed in this figure), to assist a user in positioning the unit 10 at the proper location on a jobsite; this notch corresponds with the "normal" on-grade position of the laser receiver 10.

FIG. 1 also indicates where the "normal" on-grade position is located for this receiver unit, at a horizontal line 30 (as viewed in this figure), and where an "offset" on-grade position is located for this receiver unit, at a horizontal line 32 (as viewed in this figure). FIG. 1 further indicates the maximum sensing height, between two horizontal lines 34 and 36; this height (or distance) is also designated "H5" on FIG. 1. The "normal" sensing height below on-grade is between the lines 30 and 34, and this distance is also designated "H1". The "normal" sensing height above on-grade is between the lines 30 and 36, and this distance is also designated "H2". The "offset" sensing height below on-grade is between the lines 32 and 34, and this distance is also designated "H3". The "offset" sensing height above on-grade is between the lines 32 and 36, and this distance is also designated "H4".

As can be seen by viewing FIG. 1, the "normal" on-grade line 30 runs substantially through the middle of the laser light sensor 26, while the "offset" on-grade line 32 is at a higher elevation, which provides the user with a greater sensing range for laser light strikes that impact the sensor 26 below the line 32. In other words, the sensing range H4 is of a greater distance than the sensing range H3, while the sensing ranges H1 and H2 are of equal distance. When using the laser receiver 10 in the "offset" on-grade mode, the jobsite personnel will have a greater sensing range when working above the on-grade line 32.

Figure 2:
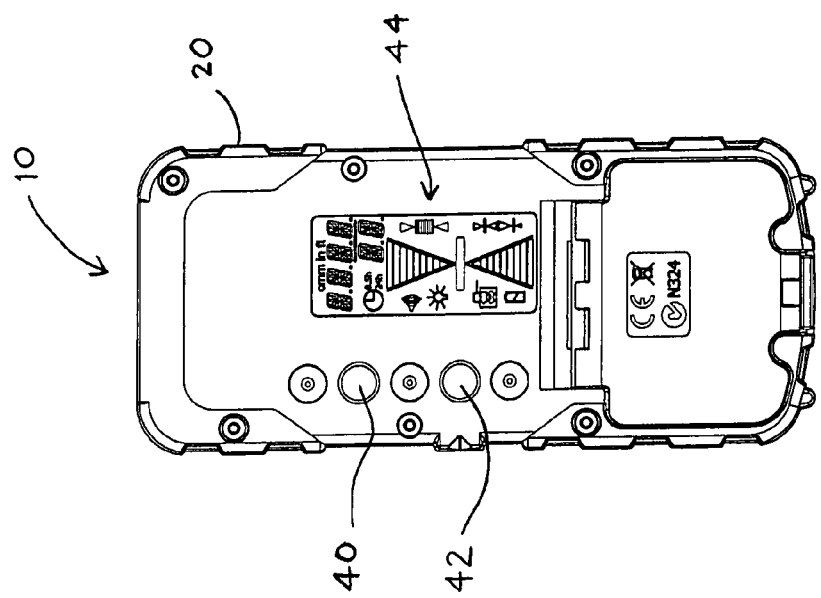
FIG. 2 is a rear view of the laser receiver unit of FIG. 1.
Figure 3:
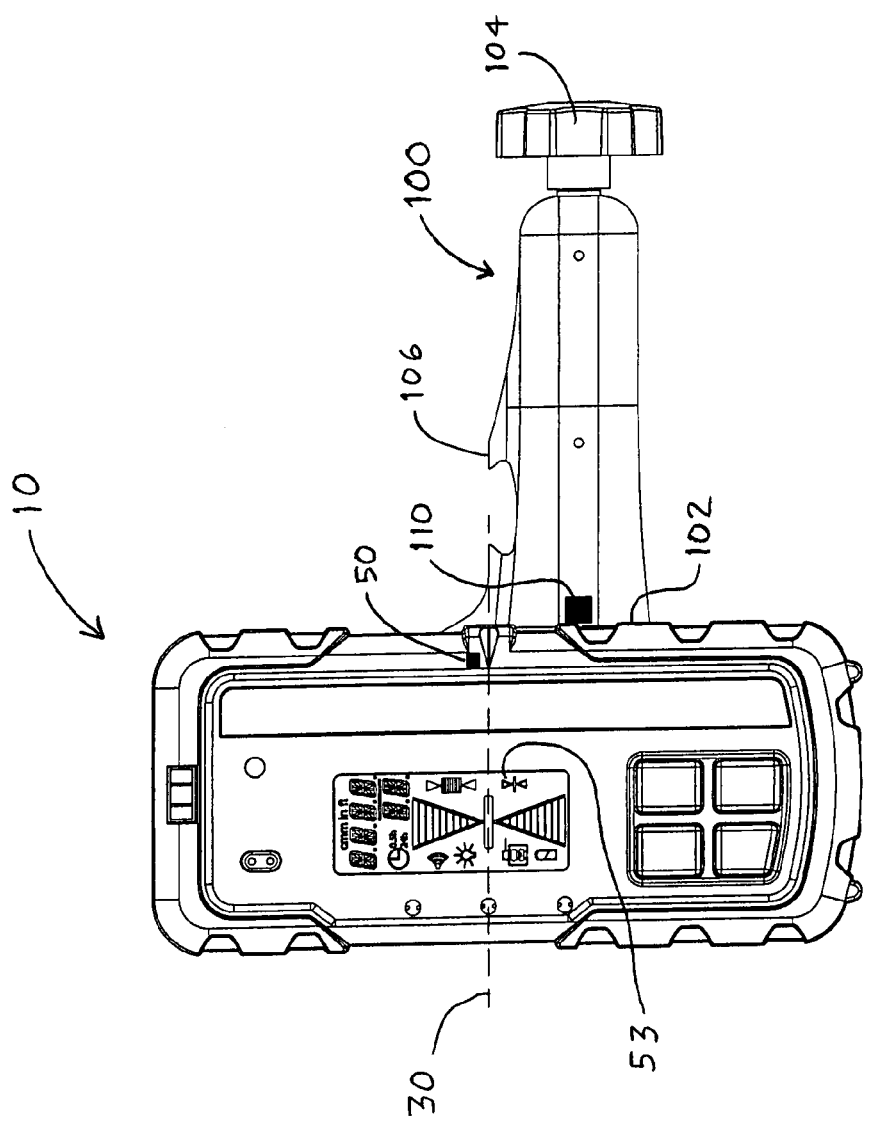
FIG. 3 is a front view of the laser receiver unit of FIG. 1, attached to a mounting clamp at an "normal" on-grade mode position.

In FIG. 2, there are two mounting holes or threaded inserts 40 and 42 that are used to mount the laser receiver 10 to a mounting clamp 100 (see FIG. 3). Insert 42 is for the "normal" on-grade position, while insert 40 is for the "offset" on-grade position. An auxiliary display 44 is located on the rear of housing 20 for this particular design of a laser receiver. (FIG. 2 is a rear view of the housing 20.) This type of laser receiver unit will be available from Apache Technologies, Inc., which is the assignee of this patent application.

FIG. 3 illustrates both the laser receiver unit 10 and a mounting clamp, generally designated by the reference numeral 100. Mounting clamp 100 has a mating surface (or mating area) 102 that is to abut the housing of the laser receiver 10. A tightening knob 104 is part of the clamp 100, and clamp 100 includes a "reference feature" 106 that assists in transferring the elevation position to a grade rod (not shown) that sometimes is used on construction jobsites. A grade rod typically has length markings to assist a user in determining the vertical elevation of certain features on a jobsite. Note that clamp 100 can be mounted to such a grade rod, or directly to a supporting structure on the jobsite. In the position depicted in FIG. 3, the clamp 100 is mounted in the "normal" on-grade position of the laser receiver 10, and the reference feature 106 corresponds with the "normal" on-grade position of the sensor 26, which is at the horizontal line 30 on FIG. 3.

The clamp 100 contains a permanent magnet 110, which is positioned near (or proximal) to the abutting surface (mating area) 102. A magnetic sensor will be used to detect a relative position of this permanent magnet. It should be noted that the permanent magnet could be intentionally offset a certain distance from the position that is depicted in FIG. 3 (i.e., away from the on-grade notch 28), but still successfully operate with the magnetic sensor.

Figure 4:
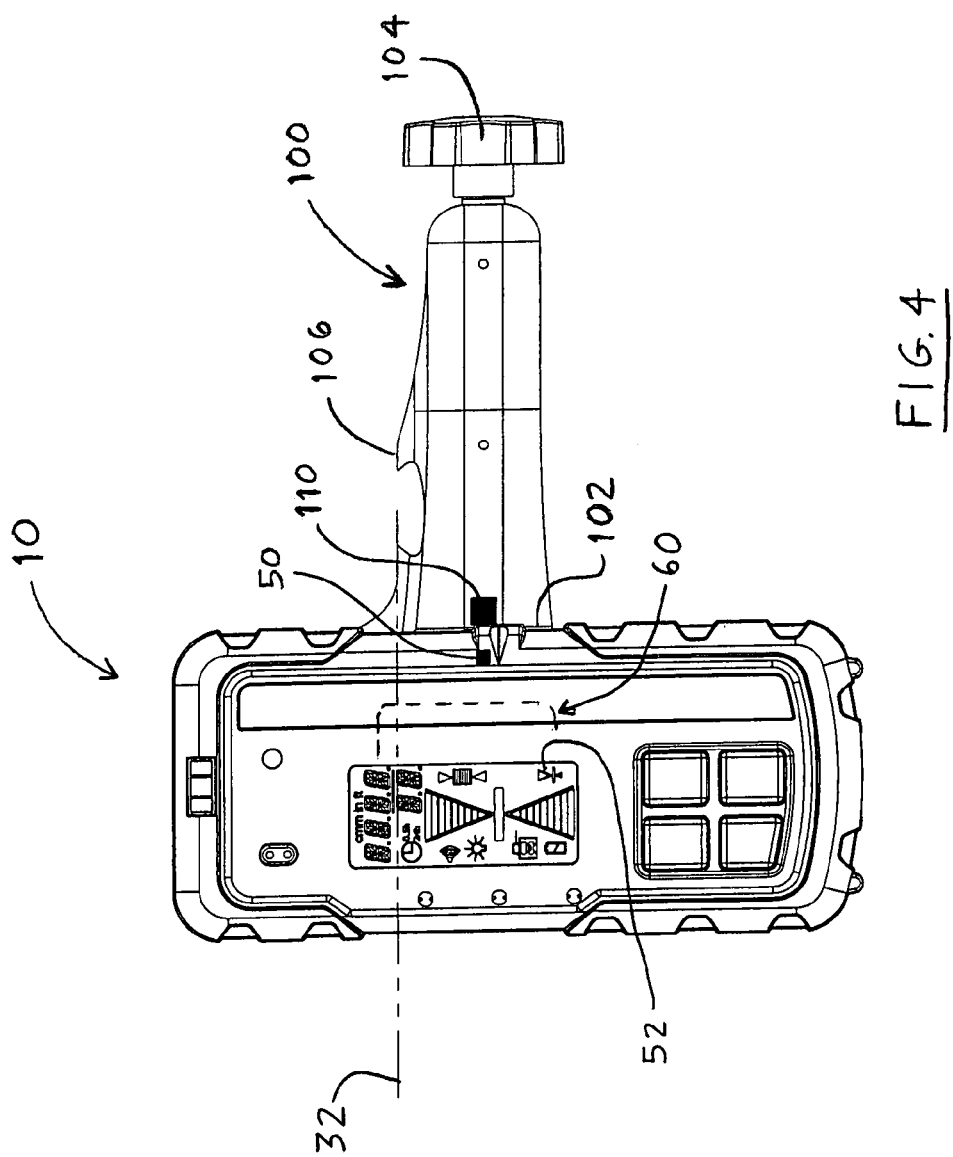
FIG. 4 is a front view of the laser receiver unit of FIG. 1, attached to the mounting clamp of FIG. 3, at a "offset" on-grade mode position.

In the illustrated embodiment, the laser receiver 10 contains a magnetic sensor 50. When the housing 20 is mounted in a predetermined orientation to the clamp 100, the magnetic sensor 50 will detect the permanent magnet 110. FIG. 4 shows this type of orientation. However, in FIG. 3, the clamp 100 and housing 20 are not so oriented, and the magnetic sensor 50 is designed so that it will not directly detect the presence of the permanent magnet 110 in this configuration. FIG. 3 shows an example of the "normal" on-grade mode of operation, in which the clamp 100 is mounted to the laser receiver 10 such that the receiver 10 will display as "on-grade" the elevation along the horizontal line 30 (in FIG. 1). When the receiver unit 10 operates in this mode, a visual indicator 53 will be illuminated, to directly inform the user that the laser receiver is currently in that "normal" on-grade mode of operation.

It should be noted that the permanent magnet could be intentionally offset a certain distance from the position that is depicted in FIG. 4 (i.e., away from the on-grade notch 28), but still successfully operate with the magnetic sensor. In other words, the magnet 100 does not necessarily have to be positioned directly opposite the magnetic sensor 50 to actuate that sensor 50, so long as the magnet 100 comes within the proximity detection range of the magnetic sensor 50.

On the other hand, FIG. 4 shows an example of the "offset" on-grade mode of operation, in which the clamp 100 is mounted to the laser receiver 10 such that the receiver 10 will display as "on-grade" the elevation along the horizontal line 32 (in FIG. 1). When the receiver unit 10 operates in this mode, a visual indicator 52 will be illuminated, to directly inform the user that the laser receiver is currently in that "offset" on-grade mode of operation. As can be seen in FIG. 4, the permanent magnet 110 now lines up fairly close to the magnetic sensor 50, and as such, the sensor 50 will "detect" the presence of magnet 110. In a preferred mode of the invention, a Hall effect switch or sensor is used as magnetic sensor 50, and sensor 50 will output a signal in a first logic state when sensing magnet 110, and will output this signal in a second (different) logic state when not sensing magnet 110 (as in FIG. 3). In other words, the permanent magnet 110 actuates the magnetic sensor 50. In the illustrated embodiment of the present invention, the magnetic sensor 50 is a Hall effect switch that is mounted on a printed circuit board within the housing 20 of laser receiver 10.

A processing circuit 60 is mounted on a circuit board that is included within the laser receiver 10, and processing circuit 60 will detect the logic state of the signal produced by the magnetic sensor 110. In essence, the magnetic sensor 110 informs the processing circuit 60 to operate in either the "offset" or "normal" on-grade mode. When it determines that the laser receiver has been mounted onto the clamp 100 as shown in FIG. 4, the processing circuit will automatically switch operating modes to the "offset" on-grade mode of operation, and will illuminate the display element 52. In addition, the "grade status" of the displays 24 and 44 will now automatically shift to the offset mode, and the "new" on-grade elevation will be along horizontal line 32, as noted above. This all occurs automatically, and the user need not press any pushbuttons or enter any commands for this to work in laser receiver 10.

In the position depicted in FIG. 4, the clamp 100 is mounted in the "offset" on-grade position of the laser receiver 10, and the reference feature 106 corresponds with the "offset" on-grade position of the sensor 26, which is at the horizontal line 32 on FIG. 4. Again, the reference feature 106 can be used to transfer elevation position of a grade rod, which now is the "offset" on-grade position of the laser receiver 10 (i.e., along line 32).

Figure 5:
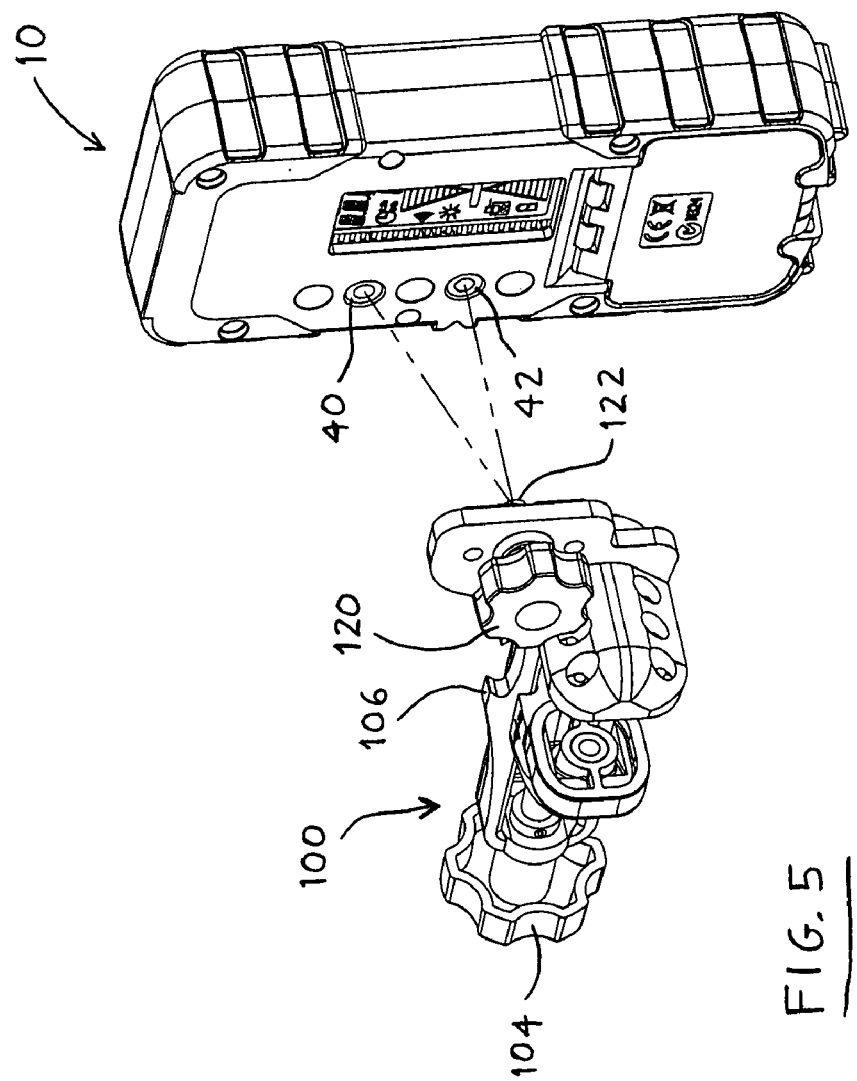
FIG. 5 is a perspective view of the laser receiver and mounting clamp combination of FIGS. 3 and 4, showing some details of how the clamp attaches to the housing of the laser receiver.

FIG. 5 shows the approximate positions of the clamp 100 and the laser receiver 10, before they are mounted to one another. A threaded screw 122 (see also FIG. 6) mates into one of the openings 40 or 42, and a tightening thumbwheel 120 is used to tighten the screw 122 into the threaded opening 40 or 42. The user selects which opening to use (i.e., either 42 or 40), and thereby selects which mode of operation is to be used next (respectively, either "normal" on-grade mode or "offset" on-grade mode). The rest is automatic.

Figure 6:
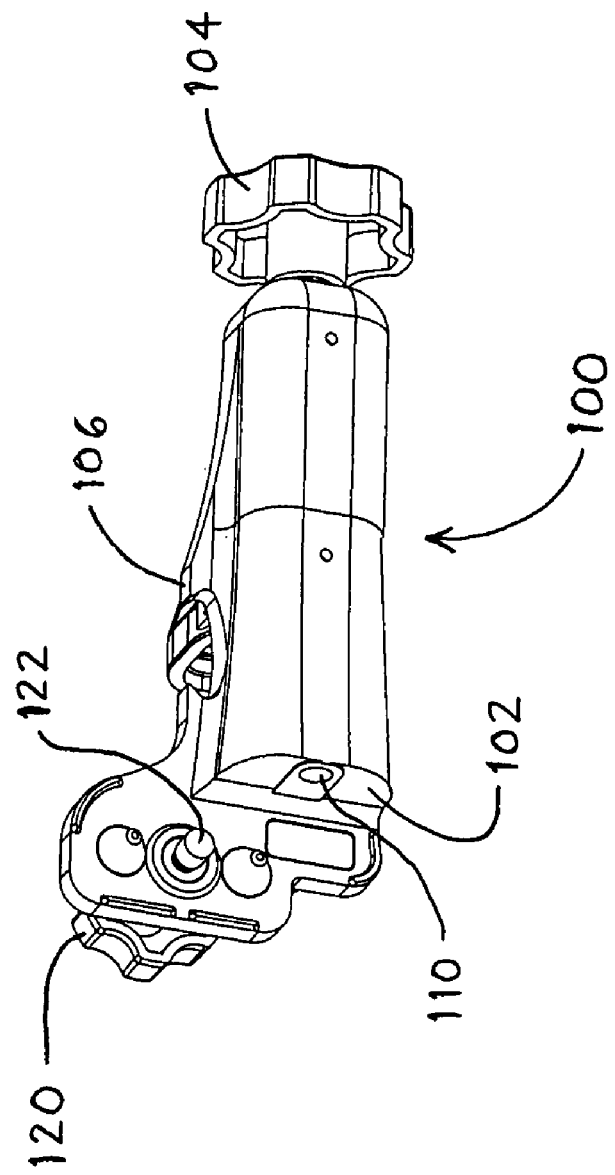
FIG. 6 is a perspective view of the mounting clamp shown in FIGS. 4-5.

FIG. 6 more clearly shows the location of the permanent magnet 100 on the clamp 100. The thumbwheel screw 120 is also depicted more clearly, showing its threaded end 122 that mates into one of the openings 40 or 42 of the laser receiver housing 20.

Below is a list of most or all of the parts illustrated on the drawings by reference numeral, and described herein:
10 laser receiver unit.
20 external housing of laser receiver unit.
22 set of user controls (e.g., pushbutton switches or membrane switches).
24 display (e.g., indicates on-grade, above-grade, or below-grade).
26 laser light receiving sensor.
28 on-grade notch.
30 horizontal line; where the "normal" on-grade position is located for this receiver unit.
32 horizontal line; where the "offset" on-grade position is located for this receiver unit.
34 horizontal line; the top-most sensing position of the sensor 26.
36 horizontal line; the bottom-most sensing position of the sensor 26.
H1 sensing height below on-grade, in "normal" on-grade mode.
H2 sensing height above on-grade, in "normal" on-grade mode (H1=H2).
H3 sensing height below on-grade, in "offset" on-grade mode.
H4 sensing height above on-grade, in "offset" on-grade mode (H3<H4).
H5 total sensing height of sensor 26 (H5=H1+H2) and (H5=H3+H4).
40 mounting hole/threaded insert; used for "offset" on-grade position.
42 mounting hole/threaded insert; used for "normal" on-grade position.
44 auxiliary display on rear of housing 20.
50 magnetic sensor (e.g., Hall effect sensor).
52 visual indicator (for "offset" on-grade mode of operation).
53 visual indicator (for "normal" on-grade mode of operation).
60 processing circuit (control circuit).
100 mounting clamp.
102 mating surface for mounting clamp.
104 tightening knob.
106 "reference feature"—assists in transferring the elevation position to a grade rod.
110 permanent magnet 110 in mounting clamp 100; near abutting surface 102.
120 tightening thumbwheel.
122 threaded screw (mates into opening 40 or 42).

In the present invention, when the laser receiver 10 is set to operate in the "offset" on-grade mode, the on-grade location is shifted to a new position on the overall sensing height capability of the laser light sensor(s), thus allowing more elevation information, either above or below the new on-grade position of the sensor. The location of the on-grade position for the one or more laser light sensors 26 of the laser receiver is sometimes referred to as the "zero-reference point." If this zero-reference point is centered within the sensing range of capability for a laser light receiver unit, then it would be said that the zero-reference point is not offset, and the laser receiver 10 is therefore operating in the "normal" on-grade mode. On the other hand, if this zero-reference point is not centered within the sensing range of capability for a laser light receiver unit, then it would be said that the zero-reference point has been offset, and the laser receiver is therefore operating in the "offset" on-grade mode.

This offset zero-reference point function is already available on some conventional laser light receivers in the construction industry, particularly for the longer, "machine control" laser receivers. Currently, with such devices that currently provide this option, it is necessary for the user to push a button on the control panel of the unit to toggle back and forth between the "normal" on-grade mode and "offset" on-grade mode. In doing this, the user/customer must know which mode is active, and then he/she must take care to align the laser receiver properly, relative to the reference elevation of the jobsite and the machine to which the receiver is mounted.

By use of the present invention, it is possible to change the on-grade position of a hand-held laser receiver by a known amount without forcing the customer/user to manually adjust the position of the receiver to compensate for this change in modes. In order to accomplish this, a mounting apparatus (e.g., the laser receiver clamp 100) is provided that can hold the laser receiver 10 in one of two different positions, and the laser receiver is able to automatically sense the position of the clamp with respect to the receiver's housing. The receiver's control circuit (e.g., processing circuit 60) is then able to automatically set the on-grade location of the laser light sensor to the corresponding position.

As noted above, one method to accomplish this methodology is to place a magnetic Hall effect sensor 50 (or Hall effect "switch") inside the housing of the laser receiver 10, and also to mount a magnet 110 within the clamp 100 or on the clamp's surface, so that when the clamp is mounted to the laser receiver in the "offset" on-grade position, the Hall effect sensor will be actuated and then produces an output signal of a predetermined state. This new state of the Hall effect sensor's output signal (i.e., the output state being exhibited by the Hall effect sensor) is detected by the control circuit, which then automatically sets the laser receiver to the "offset" on-grade mode.

When there is no magnet in proximity of the Hall effect sensor 50, the laser receiver automatically defaults to the "normal" on-grade mode (see the flow chart of FIG. 7). In this manner, the laser receiver 10 is only set to the "offset mode" when the housing of the laser receiver is mounted in the clamp in the "offset position." This is important because the laser receiver clamp 100 is designed with a reference feature 106 that transfers the appropriate on-grade position (i.e., either "normal" or "offset") to a mounting rod on which the laser receiver clamp typically is mounted.

In other words, the magnet 110 on the clamp must be appropriately proximal to the Hall effect sensor 50 for the operating mode of the control circuit 60 to automatically shift from the "normal" on-grade mode to the "offset" on-grade mode. Of course, the term "appropriately proximal" in the physical sense will be determined by the strength of the permanent magnet, and sensitivity of the Hall effect switch, and the materials that the clamp and the housing for the laser receiver are made of. Furthermore, the building steel may affect the sensing distance to a certain degree. In the present invention, it is desired for the physical distance representing the term "appropriately proximal" be such that, when the laser receiver is mounted in first and second positions in the clamp, that the Hall effect sensor become located within this physical distance at one, but not both, of these first and second positions.

It will be understood that, alternatively, two Hall effect sensors could be used in the present invention, one at each appropriate position within housing 20 to detect both possible mounting schemes illustrated in FIGS. 3 and 4, if desired. This would provide the processing circuit 60 with affirmative information that the laser receiver 10 is indeed mounted to a clamp 100 at the "normal" on-grade position (as well as the "offset" on-grade position), if it was important to have that information.

It should be noted that other types of proximity sensors could be used in the present invention. Metal-detecting proximity sensors could used (such as capacitive or inductive sensors, for example), or a strictly mechanical system could be used, in which an electromechanical limit switch (e.g., a "contact" device) could be actuated for one mode by a particular shape at one of the housing positions for the clamp to mount to the laser receiver, for example. Moreover, optoelectronic sensors could be used for this proximity sensor function. Furthermore, other types of magnetic sensors could be used in the present invention, such as a reed switch for example.

FIG. 7 shows a flow chart of some of the logical decisions made by the processing circuit 60, when operating the laser receiver 10 as used in the present invention. It will be understood that the logical operations could be in the reverse sense of that illustrated, or that more that two offset grade lines could be used with multiple magnets and/or sensors, all without departing from the principles of the present invention.

On FIG. 7, a step 200 begins a subroutine that determines whether or not the "normal" or "offset" on-grade mode of operation should be used by the laser receiver unit. This flow chart is provided in conjunction with the example laser receiver system in which a single permanent magnet is used on the mounting clamp, and a single magnetic sensor is used to determine whether a magnet is within the proximity of that sensor, as depicted in the illustrated embodiment. After the subroutine begins, a step 202 determines the present state of the magnetic sensor.

A decision step 204 now determines if a magnet is within proximity of the magnetic sensor at the "offset" on-grade position. If the result is YES, the logic flow is directed to a step 220, and the laser receiver will then operate in the "offset" on-grade mode. If the result is NO, the logic flow is directed to a step 210, and the laser receiver will then operate in the "normal" on-grade mode.

If in the "normal" on-grade mode, the logic flow is directed from step 210 to a step 212, and the display element 53 is illuminated, thereby visually indicating to the user that the laser receiver is in that "normal" on-grade mode. In addition, the laser receiver will use the "mid-point" line 30 as the zero-point on-grade reference line. This occurs automatically, and the user does not need to enter any commands or flip any switches.

On the other hand, if in the "offset" on-grade mode, the logic flow is directed from step 220 to a step 222, and the display element 52 is instead illuminated, thereby visually indicating to the user that the laser receiver is in that "offset" on-grade mode. In addition, the laser receiver will use the higher line 32 as the zero-point on-grade reference line. This also occurs automatically, and the user does not need to enter any commands or flip any switches.

The logic flow then returns from this subroutine at a step 230, after either step 212 or step 222 has been executed by the laser receiver's control processor 60.

As used herein, the term "clamp" can represent any type or shape of mounting apparatus, such as a mounting plate or a mounting adapter. It can be virtually any means of mounting the laser detector 10 to a grade rod, or other type of linear measuring device. The clamp 100 depicted in the drawings of this patent document is a device that is (or will be) sold by Apache Technologies, Inc. of Dayton, Ohio. A similar mounting adapter is described in U.S. Pat. No. 6,398,175, which is titled "METHOD AND APPARATUS FOR PROVIDING A LASER DETECTOR CLAMP APPARATUS WITH REVERSIBLE JAW ADAPTER," assigned to Apache Technologies, Inc., and is incorporated herein by reference in its entirety.

As used herein, the term "proximal" can have a meaning of closely positioning one physical object with a second physical object, such that the two objects are perhaps adjacent to one another, although it is not necessarily required that there be no third object positioned therebetween. In the present invention, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

As used herein, the term "proximity" will typically have a meaning of closely positioning one physical object with respect to a second physical object, such that the two objects are perhaps adjacent to one another, although it is not necessarily required that there be no third object positioned therebetween. The two objects can abut one another, although that is certainly not required, particularly when discussing the proximity of a magnetic sensor with respect to a permanent magnet, which produces a magnetic field in free space.

It will also be understood that the logical operations described in relation to the flow chart of FIG. 7 can be implemented using sequential logic, such as by using microprocessor technology, or using a logic state machine, or perhaps by discrete logic; it even could be implemented using parallel processors. One preferred embodiment may use a microprocessor or microcontroller to execute software instructions that are stored in memory cells within an ASIC. In fact, the entire microprocessor, along with RAM and executable ROM, may be contained within a single ASIC, in one mode of the present invention. Of course, other types of circuitry could be used to implement these logical operations depicted in the drawings without departing from the principles of the present invention.

It will be further understood that the precise logical operations depicted in the flow chart of FIG. 7, and discussed above, could be somewhat modified to perform similar, although not exact, functions without departing from the principles of the present invention. The exact nature of some of the decision steps and other commands in these flow charts are directed toward specific future models of laser light detectors (those involving laser receivers/detectors manufactured by Apache Technologies, Inc., for example) and certainly similar, but somewhat different, steps would be taken for use with other models or brands of laser light detectors/receivers in many instances, with the overall inventive results being the same.

All documents cited in the Background of the Invention and in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A laser light receiver system, comprising:
    (a) a laser light receiver, having:
        (i) a housing that has at least two predetermined mounting locations;
        (ii) a first laser light photosensor, which generates a first signal if receiving a beam of laser light energy from an external laser light source;
        (iii) a visible readout to indicate if said laser light receiver is substantially on-grade with respect to said received beam of laser light energy;
    (b) a mounting apparatus having:
        (i) at least one mating area to receive said housing at one of said at least two predetermined mounting locations of the housing; and
        (ii) a physical feature that is positioned at a predetermined location with respect to said at least one mating area; and
    (c) said laser light receiver further comprising:
        (iv) a sensor that detects said physical feature of the mounting apparatus, and produces a second signal having a first logic state if said laser light receiver detects a first state of said physical feature of the mounting apparatus, and produces said second signal having a second logic state if said laser light receiver detects a second state of said physical feature of the mounting apparatus; and
        (v) a processing circuit that receives said first signal and said second signal, wherein said processing circuit is configured: (A) to automatically select a zero-reference point from at least two possible states; (B) to enable a first state of the zero-reference point if said processing circuit receives said first logic state of said second signal; (C) to enable a second state of the zero-reference point that is different than said first state of the zero-reference point if said processing circuit receives said second logic state of said second signal; and (D) to determine whether said received beam of laser light energy has impacted said first laser light photosensor at an on-grade position, with respect to said enabled zero-reference point.

2. The laser light receiver system as recited in claim 1, wherein said physical feature comprises a permanent magnet, and said sensor comprises a magnetic proximity sensor.

3. The laser light receiver system as recited in claim 2, wherein said magnetic proximity sensor comprises one of: (a) a Hall effect switch; and (b) a reed switch.

4. The laser light receiver system as recited in claim 1, wherein said physical feature comprises a mechanical member, and said sensor comprises an electromechanical limit switch.

5. The laser light receiver system as recited in claim 1, wherein said physical feature comprises a mechanical member, and said sensor comprises an optoelectronic switch.

6. The laser light receiver system as recited in claim 1, wherein said physical feature comprises an optical target, and said sensor comprises an optical vision sensor.

7. The laser light receiver system as recited in claim 1, wherein said first state of the zero-reference point is substantially at a mid-point of a total sensing range of said first laser light photosensor, and said second state of the zero-reference point is higher in elevation than said mid-point.

8. The laser light receiver system as recited in claim 1, wherein said first state of the zero-reference point is substantially at a mid-point of a total sensing range of said first laser light photosensor, and said second state of the zero-reference point is lower in elevation than said mid-point.

9. The laser light receiver system as recited in claim 1, wherein said physical feature comprises a permanent magnet, and said sensor comprises a magnetic proximity sensor, in which:
(a) said magnetic proximity sensor, if detecting said permanent magnet, informs said processing circuit to operate said laser receiver in a "normal" on-grade mode; and
(b) said magnetic proximity sensor, if not detecting said permanent magnet, informs said processing circuit to operate said laser receiver in an "offset" on-grade mode.

10. The laser light receiver system as recited in claim 1, wherein said physical feature comprises a permanent magnet, and said sensor comprises a magnetic proximity sensor, in which:
(a) said magnetic proximity sensor, if detecting said permanent magnet, informs said processing circuit to operate said laser receiver in an "offset" on-grade mode; and
(b) said magnetic proximity sensor, if not detecting said permanent magnet, informs said processing circuit to operate said laser receiver in a "normal" on-grade mode.

11. The laser light receiver system as recited in claim 1, wherein said physical feature comprises a permanent magnet, and said sensor comprises two spaced-apart magnetic proximity sensors, in which:
(a) a first of the magnetic proximity sensors, if detecting said permanent magnet, informs said processing circuit to operate said laser receiver in a "normal" on-grade mode; and
(b) a second of the magnetic proximity sensors, if detecting said permanent magnet, informs said processing circuit to operate said laser receiver in an "offset" on-grade mode.

12. The laser light receiver system as recited in claim 1, wherein said mounting apparatus further comprises:
(a) at least one clamp for attaching to a grade rod; and
(b) a physical reference feature to allow a user to visually transfer elevation position to said grade rod.

13. The laser light receiver system as recited in claim 1, further comprising a second laser light photosensor, which generates a third signal if receiving a beam of laser light energy from an external laser light source, in which said processing circuit also receives said third signal, and said processing circuit is further configured: (E) to determine whether said received beam of laser light energy has impacted said second laser light photosensor at an on-grade position, with respect to said enabled zero-reference point;
wherein said second laser light photosensor is on a different surface of said housing than said first laser light photosensor.

14. The laser light receiver system as recited in claim 1, further comprising a first visual display that automatically indicates whether said enabled zero-reference point is at one of: (a) a "normal" on-grade position; and (b) an "offset" on-grade position.

15. The laser light receiver system as recited in claim 14, further comprising a second visual display that automatically indicates whether said enabled zero-reference point is at one of: (a) a "normal" on-grade position; and (b) an "offset" on-grade position;
wherein said second visual display is on a different surface of said housing than said first visual display.

16. The laser light receiver system as recited in claim 1, wherein said first laser light photosensor comprises at least one of: (a) a light conducting rod with two photocells arranged one each at opposite ends of said light conducting rod; and (b) a plurality of individual photocells arranged in a spatial pattern.

17. A laser light receiver system, comprising:
(a) a laser light receiver, having:
(i) a housing that has at least two predetermined mounting locations;
(ii) a first laser light photosensor, which generates a first signal if receiving a beam of laser light energy from an external laser light source;
(iii) a visible readout to indicate if said laser light receiver is substantially on-grade with respect to said received beam of laser light energy; and
(b) a mounting apparatus having:
(i) a mating area to receive said housing at one of said at least two predetermined mounting locations of the housing; and
(ii) a permanent magnet positioned at a predetermined location that is proximal to said mating area;
(c) said laser light receiver further comprising:
(iv) a magnetically-actuated sensor that produces a second signal having a first logic state if said magnetically-actuated sensor is substantially within a predetermined proximity of said permanent magnet that is located on said mounting apparatus, and produces said second signal having a second logic state if said magnetically-actuated sensor is not substantially within said predetermined proximity of said permanent magnet; and
(v) a processing circuit that receives said first signal and said second signal, wherein said processing circuit is configured: (A) to automatically select a zero-reference point from at least two possible states; (B) to enable a first state of the zero-reference point if said processing circuit receives said first logic state of said second signal; (C) to enable a second state of the zero-reference point that is different than said first state of the zero-reference point if said processing circuit receives said second logic state of said second signal; and (D) to determine whether said received beam of laser light energy has impacted said first laser light photosensor at an on-grade position, with respect to said enabled zero-reference point.

18. The laser light receiver system as recited in claim 17, wherein said magnetically-actuated sensor comprises one of: (a) a Hall effect switch; and (b) a reed switch.

19. The laser light receiver system as recited in claim 17, wherein said first state of the zero-reference point is substantially at a mid-point of a total sensing range of said first laser light photosensor, and said second state of the zero-reference point is higher in elevation than said mid-point.

20. The laser light receiver system as recited in claim 17, wherein said first state of the zero-reference point is substantially at a mid-point of a total sensing range of said first laser light photosensor, and said second state of the zero-reference point is lower in elevation than said mid-point.

21. The laser light receiver system as recited in claim 17, wherein said mounting apparatus further comprises:
  (a) at least one clamp for attaching to a grade rod; and
  (b) a physical reference feature to allow a user to visually transfer elevation position to said grade rod.

22. The laser light receiver system as recited in claim 17, wherein said first laser light photosensor comprises at least one of: (a) a light conducting rod with two photocells arranged one each at opposite ends of said light conducting rod; and (b) a plurality of individual photocells arranged in a spatial pattern.

23. A laser light receiver, comprising:
  (a) a housing that has at least two predetermined mounting locations;
  (b) a laser light photosensor, which generates a signal if receiving a beam of laser light energy from an external laser light source;
  (c) a visible readout to indicate if said laser light receiver is substantially on-grade with respect to said received beam of laser light energy;
  (d) a sensor that detects a predetermined external physical parameter proximal to one of said at least two predetermined mounting locations, wherein:
    (i) said sensor exhibits a first output state if it detects said predetermined external physical parameter proximal to a first one of said at least two predetermined mounting locations;
    (ii) said sensor exhibits a second output state if it does not detect said predetermined external physical parameter proximal to said first one of said at least two predetermined mounting locations; and
  (e) a processing circuit that receives said signal and determines a present output state of said sensor, wherein said processing circuit is configured: (i) to automatically select a zero-reference point from at least two possible states; (ii) to enable a first state of the zero-reference point if said processing circuit determines said first output state of said sensor; (iii) to enable a second state of the zero-reference point that is different than said first state of the zero-reference point if said processing circuit determines said second output state of said sensor; and (iv) to determine whether said received beam of laser light energy has impacted said laser light photosensor at an on-grade position, with respect to said enabled zero-reference point, and if so to indicate that on-grade status on said visible readout.

24. The laser light receiver as recited in claim 23, wherein said predetermined external physical parameter comprises a permanent magnet, and said sensor comprises a magnetic proximity sensor.

25. The laser light receiver as recited in claim 23, wherein said first state of the zero-reference point is substantially at a mid-point of a total sensing range of said laser light photosensor, and said second state of the zero-reference point is higher in elevation than said mid-point.

26. The laser light receiver as recited in claim 23, wherein said first state of the zero-reference point is substantially at a mid-point of a total sensing range of said laser light photosensor, and said second state of the zero-reference point is lower in elevation than said mid-point.

27. The laser light receiver as recited in claim 23, wherein said laser light photosensor comprises at least one of: (a) a light conducting rod with two photocells arranged one each at opposite ends of said light conducting rod; and (b) a plurality of individual photocells arranged in a spatial pattern.

* * * * *